(12) United States Patent
Rauhala

(10) Patent No.: US 12,431,985 B2
(45) Date of Patent: *Sep. 30, 2025

(54) BLUETOOTH RANGE EXTENDER FOR UNDERWATER USE TO CONNECT SMARTWATCH TO HEADPHONES

(71) Applicant: Finnovate Group LLC, Solana Beach, CA (US)

(72) Inventor: Kari Kristian Rauhala, Solana Beach, CA (US)

(73) Assignee: Finnovate Group LLC, Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,961

(22) Filed: Sep. 15, 2023

(65) Prior Publication Data

US 2024/0007198 A1 Jan. 4, 2024

Related U.S. Application Data

(63) Continuation of application No. 17/562,831, filed on Dec. 27, 2021, now Pat. No. 11,764,881, which is a continuation of application No. 16/845,016, filed on Apr. 9, 2020, now Pat. No. 11,212,014.

(60) Provisional application No. 62/831,623, filed on Apr. 9, 2019.

(51) Int. Cl.
*H04B 13/00* (2006.01)
*H04B 7/15* (2006.01)
*H04B 5/24* (2024.01)

(52) U.S. Cl.
CPC ............... *H04B 13/00* (2013.01); *H04B 7/15* (2013.01); *H04B 5/24* (2024.01)

(58) Field of Classification Search
CPC ........ H04B 13/00; H04B 5/0006; H04B 5/00; H04B 7/15
See application file for complete search history.

(56) References Cited

U.S. PATENT DOCUMENTS

| | | | | |
|---|---|---|---|---|
| 11,212,014 | B2* | 12/2021 | Rauhala | H04B 13/02 |
| 11,764,881 | B2* | 9/2023 | Rauhala | H04B 13/00 |
| | | | | 375/211 |
| 2016/0227354 | A1 | 8/2016 | Zhao et al. | |
| 2018/0331752 | A1 | 11/2018 | Ashworth et al. | |
| 2020/0176857 | A1 | 6/2020 | Ahola et al. | |

\* cited by examiner

*Primary Examiner* — Curtis B Odom
(74) *Attorney, Agent, or Firm* — FisherBroyles LLP; James P. Cleary

(57) ABSTRACT

An aquatic environment audio system for communication of wireless audio signals between a smartwatch and headphones worn by a user includes one or more wireless repeaters. Each of the one or more wireless repeaters includes a waterproof housing, an attachment mechanism for attaching the waterproof housing to the user between the smartwatch and the headphones. Each of the one or more wireless repeaters further includes a first antenna for receiving wireless signals from the smartwatch, repeater circuitry coupled with the first antenna for processing the wireless signals received from the smartwatch, and a second antenna coupled with the wireless repeater circuitry for transmitting the processed wireless signals to the headphones. One or more of the first antenna, repeater circuitry, and second antenna are contained in the waterproof housing.

6 Claims, 5 Drawing Sheets

BLUETOOTH RANGE EXTENDER FOR UNDERWATER USE TO CONNECT SMARTWATCH TO HEADPHONES

CROSS REFERENCE TO RELATED APPLICATIONS

This application is a continuation of U.S. patent application Ser. No. 16/845,016, filed Apr. 9, 2020, and entitled "BLUETOOTH RANGE EXTENDER FOR UNDERWATER USE TO CONNECT SMARTWATCH TO HEADPHONES", which claims the benefit of U.S. Provisional Application No. 62/831,623, filed Apr. 9, 2019, and entitled "BLUETOOTH RANGE EXTENDER FOR UNDERWATER USE TO CONNECT SMARTWATCH TO HEADPHONES", the entirety of each which are hereby incorporated by reference herein.

BACKGROUND

A smartwatch is a wearable mobile computing device in the form of a wristwatch, and therefore is typically worn on a user's wrist. Many smartwatches include at least one media player application for the playing or streaming of digital audio files via a wireless communication channel such as WiFi or Bluetooth. A smartwatch can be paired with wireless headphones for playing digital audio files, and which most often utilize a short-link, low-power radio frequency (RF) link such as Bluetooth, and more particularly Bluetooth 2.4 GHz RF. Some modern smartwatches are waterproof, and can be used even while submerged in water.

Short-link radio technology such as Bluetooth 2.4 GHz has been designed to work on land, where a propagation range for transmitted signals is about 10 meters through the air. Such range is ample to cover a distance from a user's wrist to the user's head or ears, in the case of a pairing between a smartwatch and wireless headphones. However, in an aquatic environment, the Bluetooth signal propagation is severely attenuated. In particular, as shown in FIG. 1, Bluetooth signals in water can be attenuated 100% between 15 and 20 centimeters. Accordingly, the effective range of Bluetooth communications under water is about 0 to 15 centimeters before the signal is attenuated down to substantially zero.

Such a limited range in an aquatic environment is insufficient for reliable communications between a smartwatch on a user's wrist to headphones positioned on, around, or in a user's ears, such as when a user is swimming. Accordingly, what is needed is an apparatus for extending the range of wireless communications in an aquatic environment so that digital media files can be communicated from a smartwatch to headphones without loss of data and/or fidelity.

SUMMARY

This document presents an underwater repeater, which is also referred to herein as a link or range extender, that can be worn by a user when in an aquatic environment to extend a communication range of short-link radio frequency communications, such as Bluetooth, to enable communication between a smartwatch worn on the user's wrist to headphones on or proximate the user's ears/head.

In one aspect, the underwater repeater can include a Bluetooth repeater. The Bluetooth repeater can be coupled to an attachment mechanism, such as a band, strap, belt, sleeve, or the like, for attaching the Bluetooth repeater to a part of the user's arm, preferably between the user's wrist and the user's head.

In some aspects, an aquatic environment audio system for communication of wireless audio signals between a smartwatch and headphones worn by a user includes one or more wireless repeaters. Each of the one or more wireless repeaters includes a waterproof housing, an attachment mechanism for attaching the waterproof housing to the user between the smartwatch and the headphones. Each of the one or more wireless repeaters further includes a first antenna for receiving wireless signals from the smartwatch, repeater circuitry coupled with the first antenna for processing the wireless signals received from the smartwatch, and a second antenna coupled with the wireless repeater circuitry for transmitting the processed wireless signals to the headphones. One or more of the first antenna, repeater circuitry, and second antenna are contained in the waterproof housing.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes an aquatic environment audio system, including one or more underwater repeaters, or links, that can be used as a range extender. The repeater of the aquatic environment audio system can be worn by a user when swimming or otherwise in an aquatic environment, to extend communication range of short-link radio technology such as Bluetooth from a smartphone or smartwatch worn by the user, such as on the user's wrist to headphones worn by the user.

Figure 1:
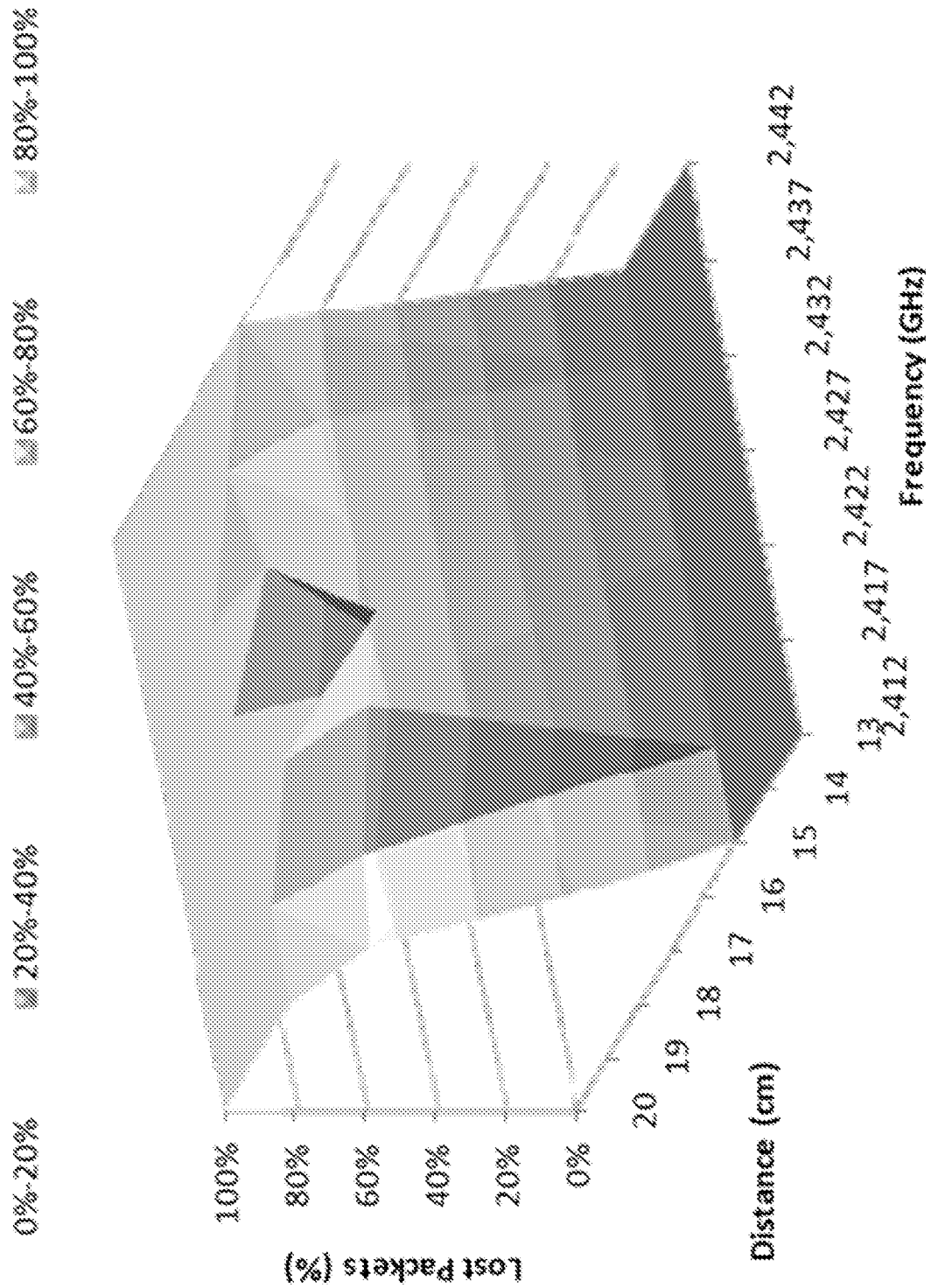
FIG. 1 illustrates attenuation of wireless transmissions in an aquatic environment.
Figure 2:
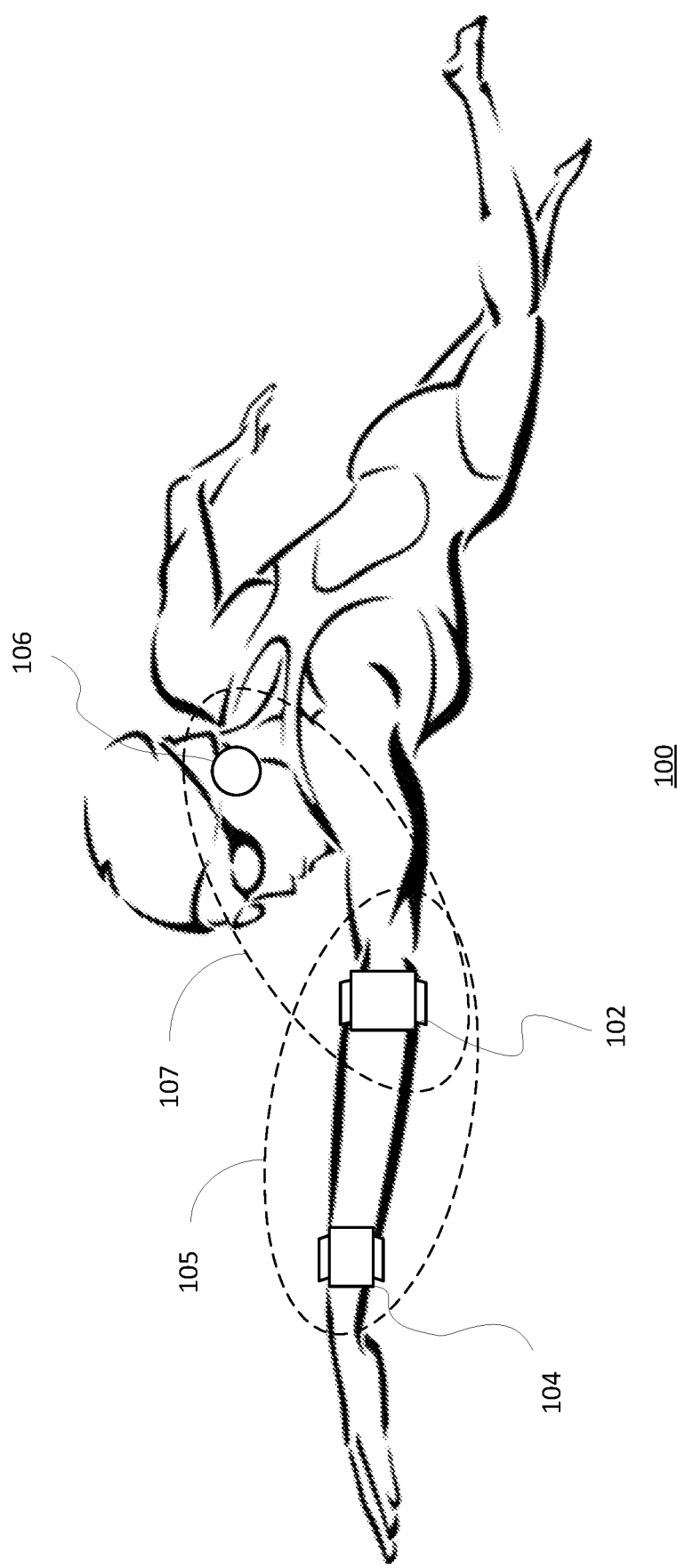
FIG. 2 shows a wireless communication system for an aquatic environment having a waterproof wireless repeater.

In a preferred exemplary implementation, as shown in FIG. 2, an aquatic environment audio system 100 includes one or more wireless repeaters 102. Each wireless repeater 102 is configured for repeating a wireless signal, such as a signal transmitted according to the Bluetooth short-range radio technology standard, between two wireless communication-enabled devices such as a smartwatch 104 that is worn on a user's wrist or a smartphone worn on a belt or band, and headphones 106, which can be worn over or in a user's ears, and which provide an audio signal from the wireless signal. The headphones 106 can also be connected with a receiver (not shown) that is attached to a band, the user's goggles, or a swim cap, or the like. The headphones 106 can be waterproof headphones or waterproof earbuds. Each wireless repeater 102 has a repeater communication range 107 that is configured to extend the effective Bluetooth range 105 of the smartwatch 104 by a factor of two or more, while conserving energy by the smartwatch 104.

Figure 3:
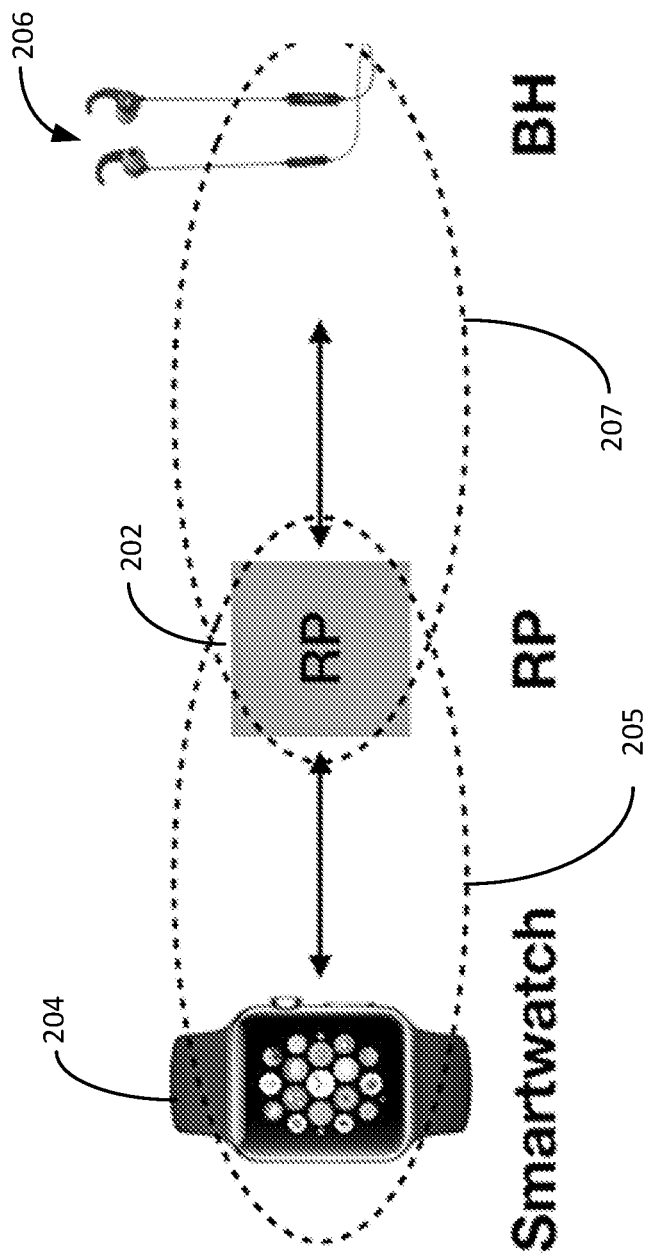
FIG. 3 illustrates a wireless communication system in accordance with implementations described herein.

As illustrated in FIG. 3, a wireless repeater 202 can be paired for communication with a smartwatch 204 or other wireless computing and/or transmission device, such as a smartphone. In an aquatic environment, the smartwatch may have a limited first transmission pattern 205 or range. The wireless repeater 202 receives signals from the smartwatch within the first transmission pattern 205, process the signals (such as amplify, filter, queue, or enhance the signals), and relay the processed signals on a second transmission pattern 207 that is configured for communication with headphones 206. The wireless repeater 202 is configured for being worn by a user at a location between the smartwatch 204 and the headphones 206, such as a location on the user's arm. The user can wear multiple wireless repeaters 202, employed in a chain-like fashion, to further extend the range of the communications from the smartwatch 204. The wireless repeater 202 can be communicatively paired with the smartwatch 204, the headphones 206, one or more other wireless repeaters 202, or other wireless transceiver, by conventional pairing techniques based on the communication technology being employed.

In some implementations, the wireless repeater 202 is paired with a smartwatch 204 and also paired with headphones 206. The wireless repeater 202 essentially relays the same data connection over two wireless links 205, 207, thus at least doubling the range enough to reach the user's headphones 206 from the user's wrist.

In some implementations, the wireless repeater 202 can have an amplified RF output power to cover a longer range. The wireless repeater 202 can include a sensor, such as a moisture sensor, accelerometer, pressure sensor, or the like, to detect moisture or a state of being in water, and which detection can then be used to dynamically increase the radio frequency (RF) output power to cover a longer distance. The output power can be increased dynamically, based on a signal from the sensor and a state sensed thereby. For instance, the sensor can determine a cycle time of the user's wrist and/or head being underwater, and/or a depth to which a Bluetooth-enabled device, such as the smartwatch 204 or headphones 206 or other wireless repeater 202, is submerged.

In some implementations, the wireless repeater 202 can be configured to covert a Bluetooth signal from wireless RF signals to magnetic induction signals, such as using Near Field Magnetic Induction, to improve the range in water. In some implementations, the wireless repeater 202 is battery powered and can be worn on the user's forearm or bicep, or other body part. The wireless repeater 202 may have an adjustable elastic band to comfortably stay in place when the user is in a swimming motion or other aquatic-based movement.

The wireless repeater 202 is configured for being positioned between the smartwatch 204 and headphones 206. e.g. wrist, arm, bicep. The wireless repeater 202 can be also integrated into a wetsuit, swim suit, goggles. The wireless repeater 202 is a waterproof device, or contained in a waterproof housing, encasement, or the like. Each wireless repeater 102 can include an attachment mechanism such as a band, belt, strap, sleeve, or the like, for attaching to or around a body part of the user, such as the user's arm or torso.

The wireless repeater 202 can have one or more directional antennas to enhance the range in and out of water. The wireless repeater 202 can also have memory buffering to overcome any transmission disruptions, and to provide swimmer a constant or continuous stream of audio. In some exemplary implementations, the headphones 206 are a waterproof Bluetooth Headset (BH) can have one or more antennas (i.e. on Left and Right speaker). As the user is wearing the smartwatch 204 on left or right wrist, the user can select a setting on the BH to use the L or R side antenna to match the corresponding side of the smartwatch 204 and improve the connection.

Figure 4:
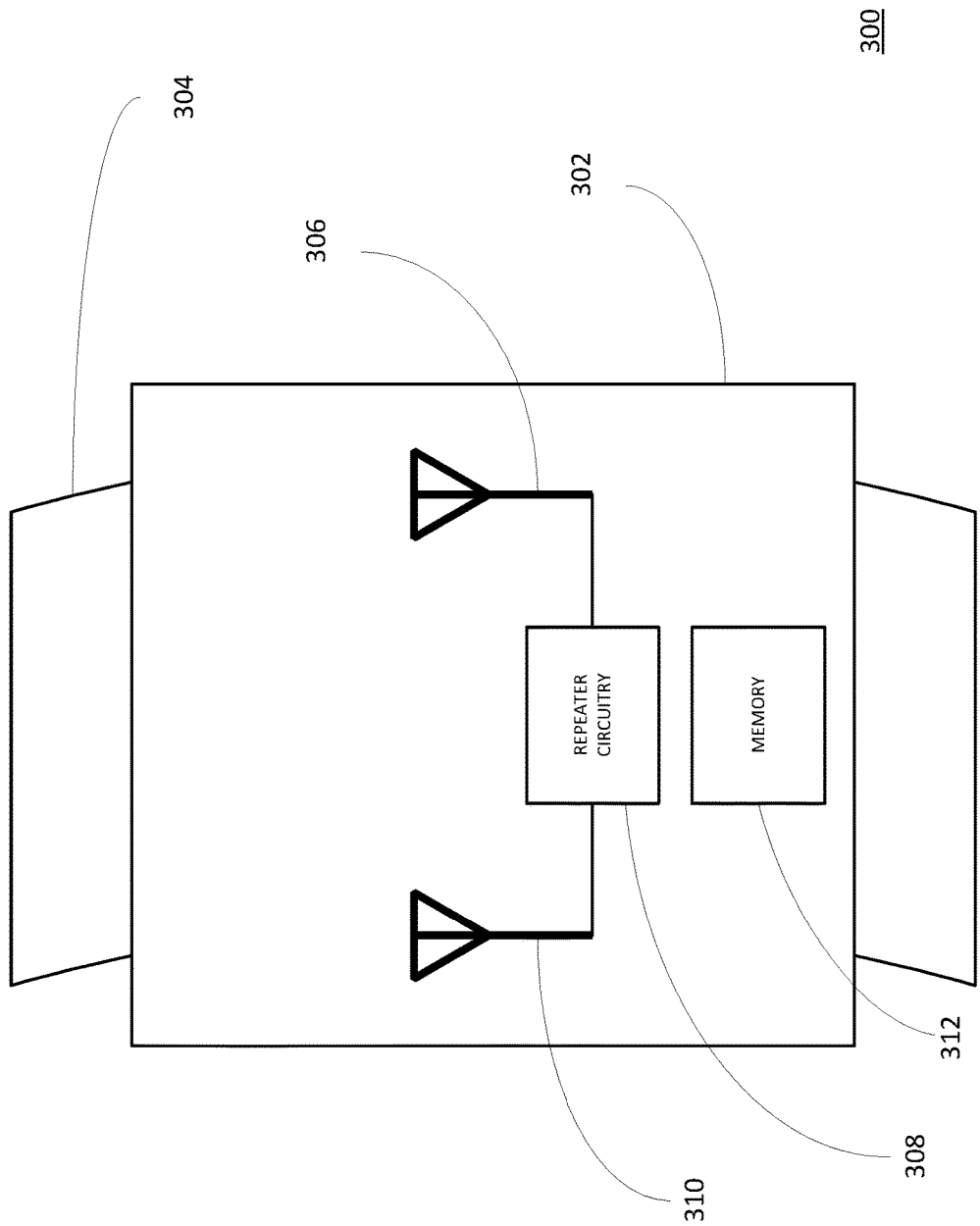
FIG. 4 shows a waterproof wireless repeater.

FIG. 4 illustrates a wireless repeater 300 having a housing 302 and a connection mechanism 304. The housing 302 is formed to be waterproof, and can be made of any water-resistant material such as plastic, nylon, acrylic, or the like, but which also allows transmission of wireless signals therethrough. The connection mechanism 304 can include a strap, snap, hook-and-loop connectors, screws, bolts, band, or the like, for allowing the wireless repeater 300 to be worn or connected with a user at a desirable location, such as the user's arm, torso, neck, or other location.

The wireless repeater 300 further includes a first antenna 306 for being in communication with, and receiving signals from, a signal-generating device, such as a smartwatch, smartphone, or the like, which is using a player application for playing and/or streaming digital audio signals. The wireless repeater 300 further includes a second antenna 310 for being in communication with, and transmitting signals to, a signal-receiving device such as wireless headphones. The wireless repeater 300 further includes repeater circuitry 308 for receiving wireless signals on the first antenna 306 and transmitting the received wireless signals on the second antenna 308. The repeater circuitry 308 can include, without limitations, one or more of an amplifier, filter, signal processor, signal transformer (i.e. from one format or protocol to another format or protocol), and signal enhancer. The first antenna 306 and/or second antenna 310 can be implemented as directional antennas, for power conservation and signal strength optimization.

Figure 5:
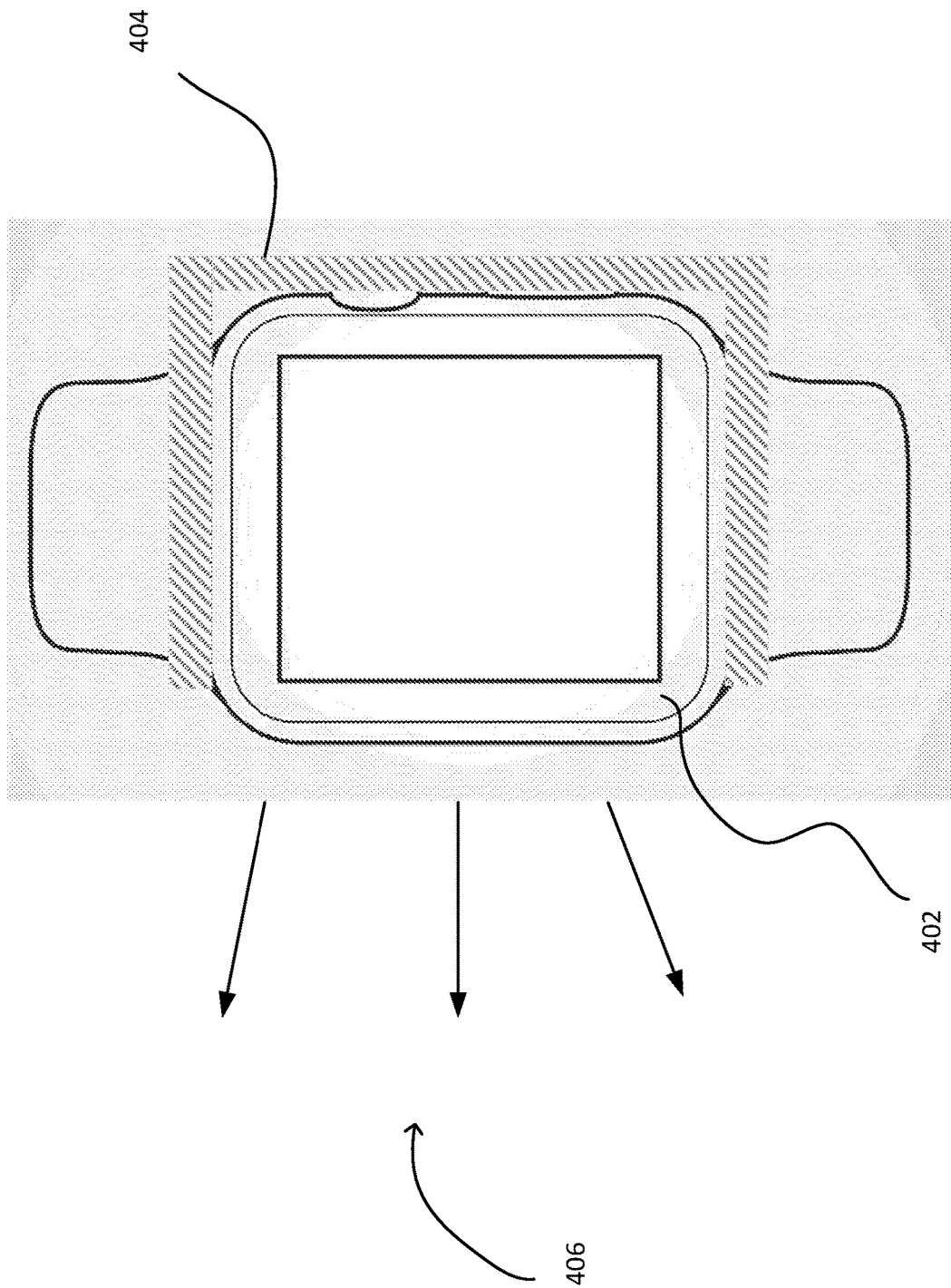
FIG. 5 illustrates an antenna reflector for a smartwatch.

FIG. 5 illustrates an antenna reflector 404 for a smartwatch 402. The antenna reflector 404 is formed and configured so as to direct a wireless transmission in a particular direction, i.e. up toward a swimmers arm or elbow, where a waterproof wireless repeater can be located. The antenna reflector 404 can be formed as a housing for the smartwatch 402, and can be made of any signal reflecting material that blocks signals from radiating in particular directions, so as to form a desired signal radiation pattern 406. The radiation pattern 406 can be directed as wide or as narrow as desired. The radiation pattern 406 that is formed allows for better connectivity with other wireless components such as a repeater or headphones, while conserving energy by not allowing an omni-directional radiation pattern that dissipates the signal, and requires more energy, in various unused directions.

The antenna reflector 404 can be formed of a signal attenuating or blocking fabric, or of a solid piece of material. Further, the antenna reflector 404 can be embedded or otherwise contained within a housing formed of a waterproof material, such as nylon, plastic, or the like.

Although a few embodiments have been described in detail above, other modifications are possible. Other embodiments may be within the scope of the following claims.

The invention claimed is:

1. An aquatic environment audio system for communication of wireless audio signals between a smartwatch worn on a wrist of a user and headphones worn on the head of the user, the system comprising:

one or more wireless repeaters, each of the wireless repeaters comprising a waterproof housing and an attachment mechanism for attaching the waterproof housing on an arm of the user within 15-20 centimeters from each of the smartwatch and the headphones, each of the wireless repeaters further including a first antenna for receiving wireless signals from the smartwatch, repeater circuitry coupled with the first antenna for processing the wireless signals received from the smartwatch, and a second antenna coupled with the wireless repeater circuitry for transmitting the processed wireless signals to the headphones, one or more of the first antenna, repeater circuitry, and second antenna being contained in the waterproof housing, wherein the wireless signals received from the smartwatch are Bluetooth signals, and wherein the processed wireless signals transmitted by the second antenna are Bluetooth signals or near-field magnetic (NFM) signals.

2. The system in accordance with claim 1, wherein each of the first antenna and the second antenna are directional antennas.

3. The system in accordance with claim 1, wherein the attachment mechanism includes a band configured for being worn around an arm of the user.

4. An aquatic environment audio system for communication of wireless audio signals between a smartwatch worn on a wrist of a user and headphones worn on the head of the user, the system comprising:

one or more wireless repeaters, each of the wireless repeaters comprising a waterproof housing and an attachment mechanism for attaching the waterproof housing on an arm of the user within 15-20 centimeters from each of the smartwatch and the headphones, each of the wireless repeaters further including an antenna for receiving wireless signals from the smartwatch, repeater circuitry coupled with the antenna configured for processing the wireless signals received from the smartwatch, and configured transmitting the processed wireless signals to the headphones, wherein the wireless signals received from the smartwatch are Bluetooth signals, and wherein the processed wireless signals transmitted by the second antenna are Bluetooth signals or near-field magnetic (NFM) signals.

5. The system in accordance with claim 4, wherein the antenna is a bi-directional antenna.

6. The system in accordance with claim 4, wherein the antenna includes a first directional antenna tuned toward the smartwatch, and a second directional antenna tuned toward the headphones.

\* \* \* \* \*